Feb. 7, 1967 G. F. MEYER 3,303,440
RADIO FREQUENCY JOINTS
Filed March 30, 1964 2 Sheets-Sheet 1

INVENTOR.
GEORGE F. MEYER
BY John N. Wolfram
ATTORNEY

RADIO FREQUENCY JOINTS

Filed March 30, 1964 2 Sheets-Sheet 2

INVENTOR.
GEORGE F. MEYER
BY John N. Wolfram
ATTORNEY

3,303,440
RADIO FREQUENCY JOINTS

George F. Meyer, Playa Del Rey, Calif., assignor to Parker-Hannifin Corporation, Cleveland, Ohio, a corporation of Ohio Filed Mar. 30, 1964, Ser. No. 355,785
9 Claims. (Cl. 333—98)

This invention relates to joints for metallic housing members and more particularly to means for establishing good electrical connection between metallic interfaces and for preventing leakage of electromagnetic waves therebetween.

As is well known, metallic housings act as a barrier to prevent electromagnetic waves propagating within the housing from passing to the exterior, and vice versa. Housings within which electromagnetic waves are to be contained may be, for example, metal conduits for wave guide transmission systems. Housing from which exterior waves are to be excluded may be containers, cabinets, or even entire buildings in which electronic circuitry sensitive to exterior radio waves is contained.

To be most effective, the metallic housings should have no openings to ambient. Joints between housing sections, or between the housing and cover plates or doors, which close access openings should be metal-to-metal without gaps. Furthermore, such joints should have good electrical conductivity between the parts making up the joint.

In wave guide transmission systems, for example, an electric current travels along the wave guide conduit when an electromagnetic wave is directed through the conduit interior. The current travels in a very thin section of the conduit wall immediately adjacent to and surrounding the passage through the conduit. The thickness of this thin section is inversely proportional to the square root of the product of the quantity frequency, permeability and conductivity of the conduit material. To minimize energy loss, it is necessary to establish good electrical conductivity between joined sections of the conduit at the thin section referred to so as to premit the current to travel through the conduit with minimum resistance. Any interruption in the thin section and any abrupt changes in direction of the current travelling therethrough, such as might be due to either an interrupted electrical contact about the circumference of the conduit passage or to misalignment of the passages through the conduit, can greatly impair the efficiency of the energy transmission system.

To provide good electrical connection between joined housing parts, it is necessary to pierce the oxide coating which usually forms on the contact surfaces by exposure to atmosphere before the joint is made up. To this end it has heretofore been proposed to provide gaskets for insertion between the housing parts and having raised sharp points for piercing the oxide coating as the joint is being made. Although such sharp points are satisfactory for many installations, it has been found that for some installations such sharp points do not provide sufficient electrical conductivity across the joint nor do the spaces between the points provide sufficient attenuation of radio waves to afford the high degree of shielding required.

In the present invention good electrical connection between a pair of contact surfaces is obtained by providing a series of V-shaped ridges in one of the surfaces which is to be butted against the other surface. These ridges extend completely across the thin section in which the current travels and are raised so as to penetrate the oxide coating of the opposed surface against which they abut.

In the ideal situation, it is desirable to have the ridges embed completely within the opposed surface so that the spaces between the ridges will be completely filled with metal and thus avoid formation of leakage paths for radio waves. Because it is not always possible to completely embed the ridges in actual practice, the present invention further contemplates making the ridges in such manner and of such size that any radio waves propagating within the spaces between the ridges will be almost completely attenuated whereby there will be no appreciable passage of wave energy therethrough. This is accomplished by making the maximum cross section dimension of the spaces between the ridges less than one-half the wave length of the highest frequency component to be attenuated and by making the length of the spaces (and hence the ridges) at least three times the maximum cross section dimension of the spaces. With this arrangement, waves entering the spaces will be attenuated exponentially and the total attenuation will be proportional to the length of the space.

As illustrated in the drawings, the present invention may take the form of an apertured plate or gasket for insertion between a pair of conduit or housing members or it may be in the form of an imperforate cover plate or door for closing an opening in a housing. In either case, the surfaces of the gasket or cover plate which are to butt against a housing surface are provided with V-shaped ridges which are to be embedded in the housing surface. The ridges extend across the thin section in which the current flows so as to be in the direct path of the current. The spacing and length of the ridges is such that the spaces remaining therebetween when the ridges are embedded will almost completely attenuate radio waves propagating therein.

The invention will be further described in conjunction with the drawings, in which.

Figures 1, 2:
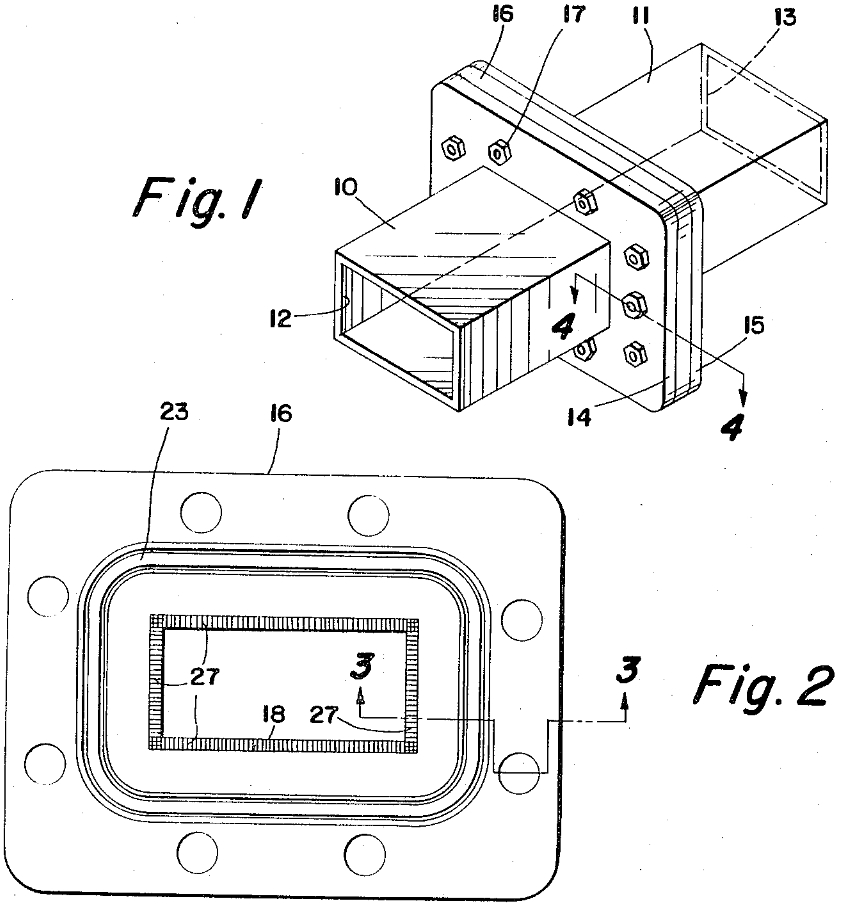
FIGURE 1 is a perspective view of a portion of a hollow wave guide conduit.
FIGURE 2 is a plan view of a gasket for insertion between sections of wave guide conduits.
Figures 3, 4:
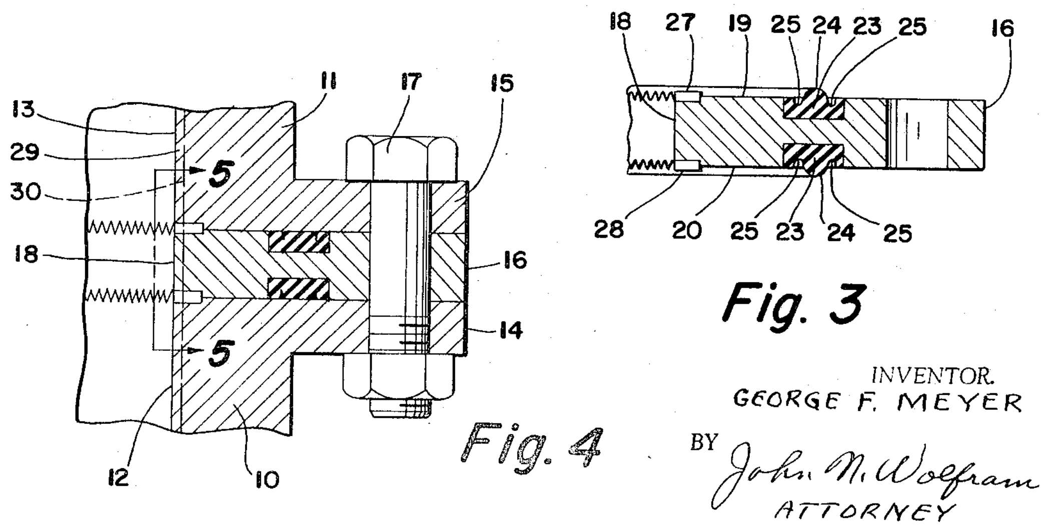
FIGURE 3 is a section view along the lines 3—3 of FIGURE 2.
FIGURE 4 is a cross section view taken along the lines 4—4 of FIGURE 1.

As shown in FIGURE 1, wave guide conduits 10 and 11 have openings 12 and 13 therethrough and have flanges 14, 15 attached to their ends, the flanges having continuations of the openings 12 and 13 therethrough. A gasket 16 is inserted between the flanges and is clamped therebetween by bolts 17. As shown in FIGURE 4, gasket 16 has an opening 18 therethrough for precise alignment with openings 12 and 13.

Gasket 16 has opposed flat faces 19 and 20, each of which is grooved to receive identical rubber-like packing members 23. Each of these packing members has a raised portion 24 which projects above the corresponding faces 19, 20 and has channels 25 which extend below the corresponding faces 19, 20. The channels provide space for receiving the projecting portion 24 when gasket 16 is clamped between flanges 14, 15. The packings serve to make the joint fluid tight so as to retain any special gas within the conduits or to retain any gas pressure to which the interior of conduits 10, 11 may be subjected, and to prevent ingress of foreign matter from the exterior of the conduits.

Figure 6:
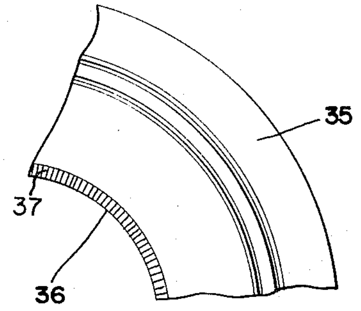
FIGURE 6 is a fragmentary end view of a radio frequency gasket of round configuration.

The inner edges of flat faces 19, 20 are provided with a series of V-shaped ridges 27, 28 which completely surround opening 18. The V-shaped ridges extend substantially perpendicularly from the adjacent edge of opening 18 and intersect such opening. In other words, the ridges extend completely to the adjacent edge of the opening. In the rectangular form of wave guide, as shown, the edges along any side of the rectangular opening 18 are parallel to each other. In the event of a circular wave guide conduit, opening 18 would also be circular and the ridges 27, 28 would extend radially of the opening, as shown in FIGURE 6.

When wave guide conduits 10, 11 are to be joined, gasket 16 is inserted between flanges 14, 15 with openings 18 in precise alignment with openings 12, 13. Bolts 17 are then tightened for bringing the opposed faces of flanges 14, 15 into tight clamping contact with faces 19, 20 of gasket 16. Ridges 27, 28, having their crests initially raised from corresponding faces 19, 20 and their roots below such faces, become embedded into the face immediately adjacent the edges of opening 12, 13 and establish good electrical contact with the flanges, both the flanges and gasket being of metal and therefore having high electrical conductivity. Contact of flat faces 19, 20 by flanges 14, 15 serve to limit the amount which ridges 27, 28 become embedded within the flanges.

In the event the surfaces of the flange or the faces 19, 20 are not precisely flat or parallel, there may be localized areas where flat faces 19, 20 do not make good metal-to-metal contact with the adjacent portion of the flange. However, since ridges 27, 28 are raised above faces 19, 20, all of the ridges will be embedded to some extent within the flanges for establishing good electrical contact completely around openings 13, 12.

When an electromagnetic wave is directed through openings 12, 13 there is an accompanying alternating electric current induced within the wall of the wave guide conduit. The path, indicated by numeral 30, in which the electric current travels is a very thin layer or section of the conduits immediately adjacent openings 12, 13, the outer boundary of this layer or section being indicated by the broken line 29 with most of the current being carried at the edge of openings 12, 13 and diminishing toward line 29. The greatest efficiency of the transmission system is obtained when the thin path 30 between openings 12, 13, 18 and line 29 is uninterrupted and has no abrupt changes in direction. For this reason it is essential that openings 12, 13 and 18 be in precise alignment, that ridges 27, 28 extend completely across path 30 and that the ridges extend completely around the openings, as shown.

Figure 5:
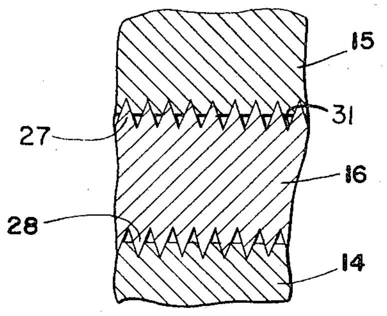
FIGURE 5 is a fragmentary view along the lines 5—5 of FIGURE 4.

When the ridges 27, 28 become embedded in the flanges, the spaces or channels 31 between the ridges will become partially filled with material from the flanges as shown in FIGURE 5. The amount of filling will depend upon how deep the ridges become embedded. The unfilled portions of the channels will in effect form elemental wave guides through which wave energy may pass in either direction. However, if the maximum cross section dimension of the unfilled portion of these spaces 31 is less than one-half the wave length of any wave propagating therein, the wave will be attenuated exponentially with the total attenuation being proportional to the length of the space. Thus, wave energy leakage therethrough will be negligible if the ridges 27, 28 are made of a length such that the unfilled portion of spaces 31 are at least three times the maximum cross section dimension of the unfilled space portions. To assure this when the ridges are only slightly embedded, the length of the ridges is made at least three times the longest initial cross section dimension of spaces 31, which in the present case is the distance between ridges. Attenuation is further maximized by having the ridges and spaces extend at substantially a right angle with the direction of current flow in the wall of the conduits.

FIGURE 6 illustrates the invention as applied to a radio frequency gasket 35 of round configuration with a circular opening 36. In this case, ridges 37, which correspond to ridges 27, 28, extend in radial directions from the center of opening 36.

Figure 7:
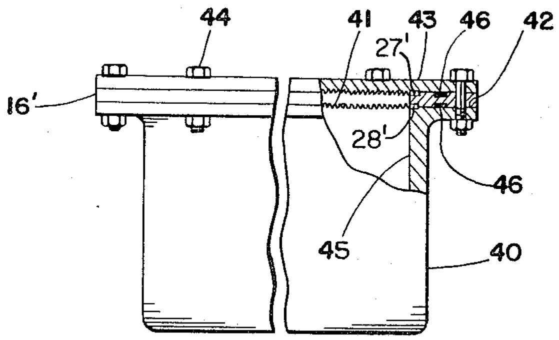
FIGURE 7 is a view partly in section of a housing closed by a cover plate with a radio frequency gasket therebetween.

FIGURE 7 illustrates a metal housing 40 having joined members for enclosing electronic equipment or circuitry (not shown) to shield the latter from external radio waves. In this case the exteriorly acting wave induce an electrical current in the housing which travels in a thin section along the exteriorly exposed faces of the housing. If gaps or high resistance occurs between the opposed faces of the joined housing parts, the current will travel inwardly toward the housing interior until it reaches an area of good electrical contact through which it can pass from the one housing member to another. For this reason, an area of good contact should be provided between the bolt holes and the housing interior when a bolted arrangement is used.

In FIGURE 7, housing member 40 has an access opening 41 surrounded by a flat flange surface 42 against which a radio frequency gasket 16', corresponding to gasket 16 shown in FIGURE 2, is pressed by a cover plate 43. The parts are held together by bolts 44 located exteriorly of ridges 27' and 28', as well as resilient packings 46. Tightening of the bolts causes ridges 27' to become embedded in plate 43 and ridges 28' to become embedded in surface 42 immediately adjacent the upper edge of opening 45.

Figure 8:
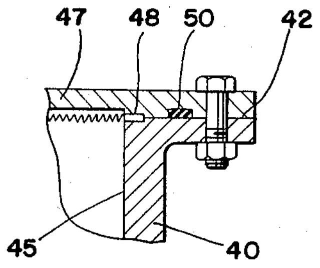
FIGURE 8 is a fragmentary section view of a housing and cover plate in which a separate radio frequency gasket is omitted.
Figure 9:
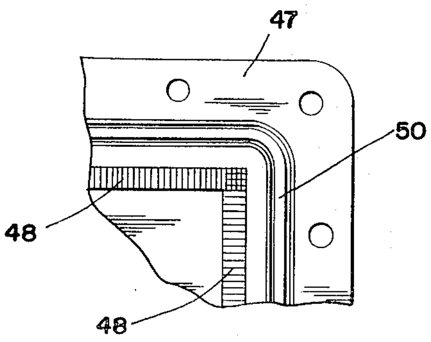
FIGURE 9 is a fragmentary plan view of the cover plate of FIGURE 8.

FIGURE 8 shows an optional arrangement for closing housing member 40 in which a separate gasket is omitted. Ridges 48 are formed directly upon cover plate 47 and are adapted to become embedded in surface 42 immediately adjacent the upper edge of opening 45. Bolts 49 are exterior of both packing 50 and ridges 48.

Ridges 48 preferably extend at substantially a right angle with the adjacent edge of the cover plate and extend slightly above the plane of the interface of the plate. The length of the ridges is at least three times the largest cross section dimension of the spaces between the ridges to effectively attenuate any radio waves entering the same from either the interior or exterior of the housing.

Although several forms of the invention have been shown and described, it is obvious that other forms may be made without departing from the scope of the invention as defined by the claims.

I claim:

1. A radio frequency gasket of electrically conductive material for insertion between a pair of apertured metallic members, said gasket having opposed faces and having an opening therethrough for alignment with the apertures, each of said faces having a series of uniformly spaced elongated sharp ridge means surrounding said opening, said ridge means extending to the edge of said opening and being adapted to be embedded in said members up to the edges of the apertures therein for establishing electrical contact therewith in substantially uniform manner around the opening and immediately adjacent thereto, said ridge means extending across only a portion of the faces of said gasket which portion is only slightly greater than the depth of major current flow along the inner surface of such apertured metallic members.

2. The gasket of claim 1 in which the ridge means extend substantially perpendicular to the adjacent edge portions of the opening.

3. The gasket of claim 1 in which the ridge means are at least three times the length of the maximum cross section dimension of the spaces between the ridges.

4. A radio frequency gasket of electrically conductive material for insertion between a pair of apertured metalilc members, said gasket having opposed faces and having an opening therethrough for alignment with the apertures, each of said faces having a series of raised uniformly spaced elongated sharp ridges of V shape surrounding said opening and intersecting the same, said ridges being adapted to become embedded in said members for establishing electrical contact therewith in substantially uniform manner around the opening and immediately adjacent thereto, said ridges extending across only a portion of the faces of said gasket which portion is only slightly greater than the depth of major current flow along the inner surface of such apertured metallic members, said ridges extending substantially perpendicular to the adjacent edge portion of the opening and being of a length at least three times the length of the maximum cross section dimension of the spaces between the ridges whereby radio waves entering said spaces when the ridges are partially embedded in said members and having a wave length more than two times as great as the maximum cross section dimension of the portion of said spaces remaining open when the ridges are embedded as described will be substantially attenuated within said spaces.

5. A first metallic member for establishing an electrical connection with a second metallic member having a surface surrounding an opening, said first member having a series of elongated ridge means on one face thereof, said ridge means being adapted to be embedded within said surface immediately adjacent said opening in said second member for establishing electrical contact with said second member, said ridge means extending across only a portion of said one face of said first member which portion is only slightly greater than the depth of major current flow along the wall of said opening in said second metallic member, said ridge means being at least three times as long as the maximum cross section dimension of the spaces between said ridge means, whereby radio waves entering said spaces when said ridge means are embedded in said surface and having a wave length more than two times as great as said maximum cross section dimension will be substantially attenuated within said spaces.

6. A first metallic member for establishing an electrical connection with a second metallic member having a surface surrounding an opening, said first member having a series of elongated V-shaped ridges on one face thereof, said ridges being adapted to be embedded within said surface immediately adjacent said opening in said second member for establishing electrical contact with said second member, said ridges extending across only a portion of said one face of said first member which portion is only slightly greater than the depth of major curent flow along the wall of said opening in said second member, said ridges having a length greater than the maximum cross section dimension of the spaces between said ridges, whereby radio waves entering said spaces when the ridges are embedded in said surface and having a wave length more than two times as great as said maximum cross section dimension will be substantially attenuated within said spaces.

7. A first metallic member for establishing an electrical connection with a second metallic member having a surface surrounding an opening, said first member having a series of elongated ridge means on one face thereof, said ridge means being adapted to be embedded within said surface and intersect said opening in a direction substantially perpendicular to the adjacent edge thereof for establishing electrical contact with said second member, said ridge means extending across only a portion of said surface which portion is only slightly greater than the depth of major current flow along the wall of said opening in said second member, said ridge means having a length greater than the maximum cross section dimension of the spaces between said ridge means, whereby radio waves entering said spaces when the ridge means are embedded in said surface and having a wave length more than two times as great as said maximum cross section dimension will be substantially attenuated within said spaces.

8. A first member in accordance with claim 7 in which said first member has an aperture therethrough and said ridge means surround said aperture and also intersect the adjacent edge thereof in a direction substantially perpendicular thereto.

9. A joint between first and second metallic members having opposed surfaces, one of said surfaces having a series of spaced, elongated ridges which are embedded within the other surface, at least one of said surfaces having a plurality of edges intersected by said ridges, said ridges extending substantially perpendicular thereto across only a portion of said one surface which portion is only slightly greater than the depth of major current flow along said edges, said ridges having a length greater than the maximum cross section dimension of the spaces between said ridges, whereby radio waves entering said spaces when the ridges are embedded in said other surface and having a wave length more than two times as great as said maximum cross section dimension will be substantially attenuated within said spaces.

References Cited by the Examiner

UNITED STATES PATENTS

| | | | |
|---|---|---|---|
| 2,464,744 | 3/1949 | Fennema | 285—342 |
| 2,543,963 | 3/1951 | Gaffin | 174—35.2 |
| 2,778,868 | 1/1957 | Stinger | 333—98 |
| 2,955,857 | 10/1960 | Smith | 333—98 |
| 2,974,183 | 3/1961 | Kes et al. | 333—98 |
| 3,138,770 | 6/1964 | Baum et al. | 333—98 |

FOREIGN PATENTS

| | | |
|---|---|---|
| 5,441 | 3/1902 | Great Britain. |
| 742,213 | 12/1955 | Great Britain. |

HERMAN KARL SAALBACH, *Primary Examiner.*

L. ALLAHUT, *Assistant Examiner.*